US011888255B2

(12) United States Patent
Fritz et al.

(10) Patent No.: US 11,888,255 B2
(45) Date of Patent: Jan. 30, 2024

(54) SINGLE PAIR ETHERNET CONNECTOR

(71) Applicant: Panduit Corp., Tinley Park, IL (US)

(72) Inventors: Robert L. Fritz, Elwood, IL (US); Benjamin S. Novak, Lockport, IL (US); Satish I. Patel, Roselle, IL (US)

(73) Assignee: Panduit Corp., Tinley Park, IL (US)

( * ) Notice: Subject to any disclaimer, the term of this patent is extended or adjusted under 35 U.S.C. 154(b) by 284 days.

(21) Appl. No.: 16/921,362

(22) Filed: Jul. 6, 2020

(65) Prior Publication Data

US 2021/0021076 A1 Jan. 21, 2021

Related U.S. Application Data

(60) Provisional application No. 62/874,274, filed on Jul. 15, 2019.

(51) Int. Cl.

| | |
|---|---|
| ***H01R 13/50*** | (2006.01) |
| ***H01R 4/30*** | (2006.01) |
| ***H01R 13/6594*** | (2011.01) |
| *H01R 24/64* | (2011.01) |
| *H01R 4/36* | (2006.01) |
| *H01R 13/447* | (2006.01) |
| *H01R 12/70* | (2011.01) |
| *H01R 13/26* | (2006.01) |
| *H01R 24/60* | (2011.01) |
| *H01R 4/34* | (2006.01) |

(52) U.S. Cl.

CPC ............... *H01R 13/50* (2013.01); *H01R 4/30* (2013.01); *H01R 13/6594* (2013.01); *H01R 4/34* (2013.01); *H01R 4/36* (2013.01); *H01R 12/7082* (2013.01); *H01R 13/26* (2013.01); *H01R 13/447* (2013.01); *H01R 24/60* (2013.01); *H01R 24/64* (2013.01); *H01R 2201/04* (2013.01)

(58) Field of Classification Search

CPC ...... H01R 13/26; H01R 2201/04; H01R 4/34; H01R 13/50; H01R 4/30; H01R 13/6594; H01R 24/64; H01R 12/7082; H01R 24/60; H01R 4/36; H01R 13/447

USPC .......................................................... 439/660

See application file for complete search history.

(56) References Cited

U.S. PATENT DOCUMENTS

| | | |
|---|---|---|
| 5,041,018 A | 8/1991 | Arnett |
| 5,938,754 A | 8/1999 | Edwards et al. |
| 6,019,641 A | 2/2000 | Kan |

(Continued)

FOREIGN PATENT DOCUMENTS

| | | |
|---|---|---|
| DE | 9014868 U1 | 1/1991 |
| DE | 202004000423 U1 | 4/2004 |

(Continued)

*Primary Examiner* — Hae Moon Hyeon
*Assistant Examiner* — Justin M Kratt
(74) *Attorney, Agent, or Firm* — Christopher S. Clancy; James H. Williams; Christopher K. Marlow

(57) ABSTRACT

A communications connector has a main housing with a front opening and first, second, and third rear openings. The connector also has first, second, and third contacts, the first contact extends from the first rear opening of the main housing to the front opening of the main housing. The second contact extends from the second rear opening of the main housing to the front opening of the main housing. The third contact extends from the third rear opening of the main housing to a shield surrounding a front portion of the main housing.

4 Claims, 12 Drawing Sheets

(56) References Cited

U.S. PATENT DOCUMENTS

| | | | |
|---|---|---|---|
| 6,059,578 A | 5/2000 | Arnett | |
| 6,109,979 A * | 8/2000 | Garnett | H01R 13/527 439/573 |
| 6,257,935 B1 | 7/2001 | Zhang et al. | |
| 6,368,160 B2 | 4/2002 | Chang | |
| 6,919,505 B2 | 7/2005 | Cox | |
| 6,961,233 B2 | 11/2005 | Hoeing et al. | |
| 7,031,168 B2 | 4/2006 | Kato et al. | |
| 7,140,887 B2 | 11/2006 | Poh et al. | |
| 7,855,548 B2 | 12/2010 | Engel | |
| 9,500,793 B2 | 11/2016 | Mickmann et al. | |
| 9,730,353 B2 | 8/2017 | Bury et al. | |
| 9,760,517 B2 | 9/2017 | Liston et al. | |
| 2007/0230142 A1 | 10/2007 | Engel et al. | |
| 2008/0183935 A1 | 7/2008 | Guenter et al. | |
| 2011/0092104 A1* | 4/2011 | Yu | H01R 24/64 439/660 |
| 2014/0126875 A1 | 5/2014 | Guzzo | |
| 2014/0294207 A1 | 10/2014 | Siegel | |

FOREIGN PATENT DOCUMENTS

| | | |
|---|---|---|
| EP | 1206008 A2 | 5/2002 |
| EP | 2256992 A1 | 12/2010 |
| EP | 2869408 A1 | 5/2015 |

* cited by examiner

SINGLE PAIR ETHERNET CONNECTOR

CROSS REFERENCE TO RELATED APPLICATIONS

This application claims benefit to U.S. Provisional Patent Application No. 62/874,274, filed on Jul. 15, 2019, the entirety of which is hereby incorporated by reference herein.

FIELD OF THE INVENTION

Industrial and building automation applications use twisted pair fieldbus cable systems to deliver power and very low bandwidth data transmission. The typical deployment of this cable is terminated to screw terminals at the cable ends. A potential benefit of single pair ethernet technology is the ability to retain the existing fieldbus cable installed in a building, saving both time and cost of purchasing and routing new cable. The high densities achievable with single pair ethernet require the use of the Lucent Connector (LC) style connectors with dedicated single pair cable running to single pair ethernet switches. There is a need to convert today's screw terminal connections to the LC style connections to allow the reuse of existing building fieldbus cable with single pair ethernet based equipment.

BACKGROUND

Industrial and building automation applications use twisted pair fieldbus cable systems to deliver power and very low bandwidth data transmission. The typical deployment of this cable is terminated to screw terminals at the cable ends. A potential benefit of single pair ethernet technology is the ability to retain the existing fieldbus cable installed in a building, saving both time and cost of purchasing and routing new cable. The high densities achievable with single pair ethernet require the use of the LC style connectors with dedicated single pair cable running to single pair ethernet switches. There is a need to convert today's screw terminal connections to the LC style connections to allow the reuse of existing building fieldbus cable with single pair ethernet based equipment.

What is needed is a migration coupler that allows for connecting existing fieldbus cable via screw terminals on one side and a single pair ethernet LC jack interface on the other side. Such a coupler would allow for installers to take advantage of the high port densities possible with single pair ethernet at the switch while allowing for using existing cable throughout the majority of the building.

SUMMARY

A communications connector has a main housing with a front opening and first, second, and third rear openings. The connector also has first, second, and third contacts, the first contact extends from the first rear opening of the main housing to the front opening of the main housing. The second contact extends from the second rear opening of the main housing to the front opening of the main housing. The third contact extends from the third rear opening of the main housing to a shield surrounding a front portion of the main housing.

DESCRIPTION OF THE INVENTION

The present invention is a means of converting legacy fieldbus cable with screw terminals to single pair ethernet LC style interface prior to populating a single pair ethernet network switch.

Figure 1:
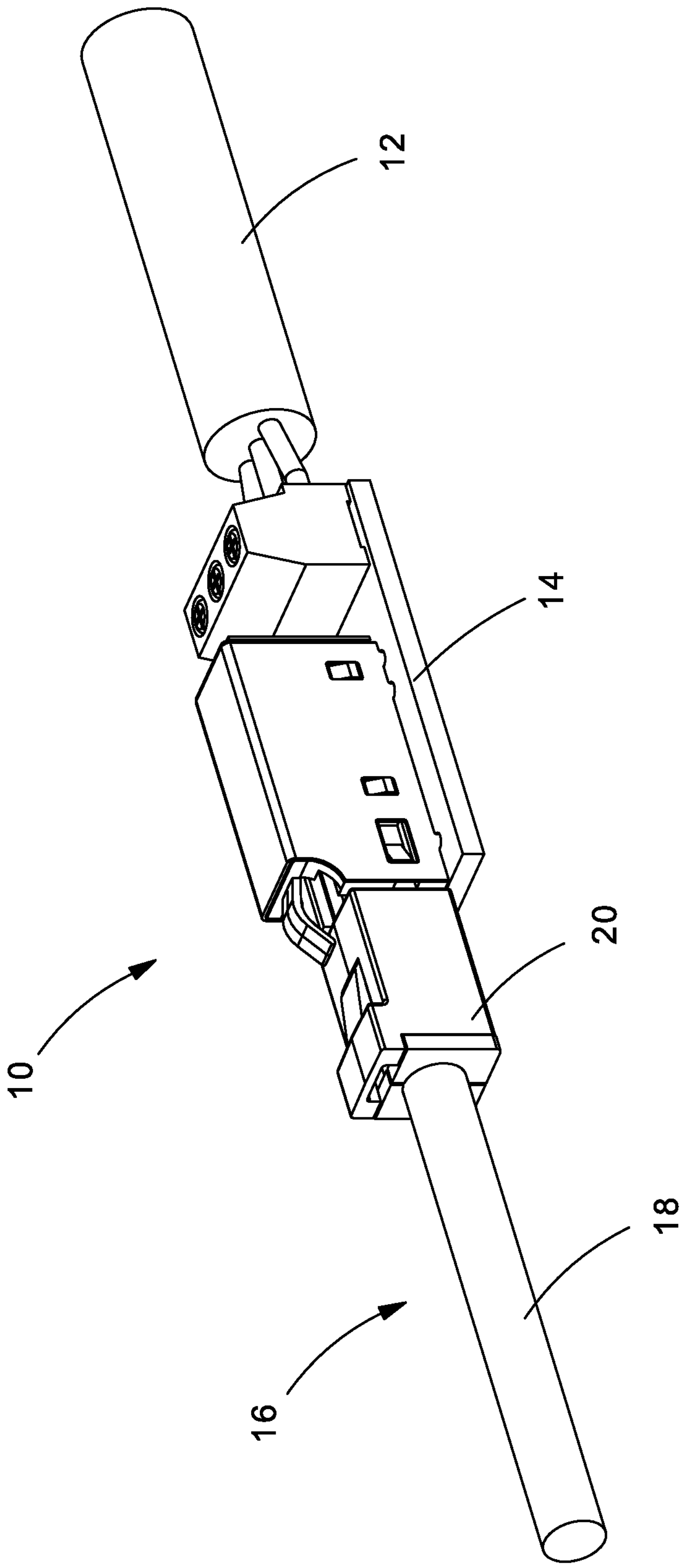
FIG. 1 is an isometric view of a first embodiment of a Fieldbus to single pair ethernet (SPE) connector.

FIG. 1 illustrates a communications channel 10 containing a fieldbus twisted pair fieldbus cable 12, a fieldbus to single pair ethernet migration coupler 14, and a single pair ethernet patch cord 16. Single pair ethernet patch cord 16 includes single pair cable 18 and single pair LC plug 20.

Figure 2:
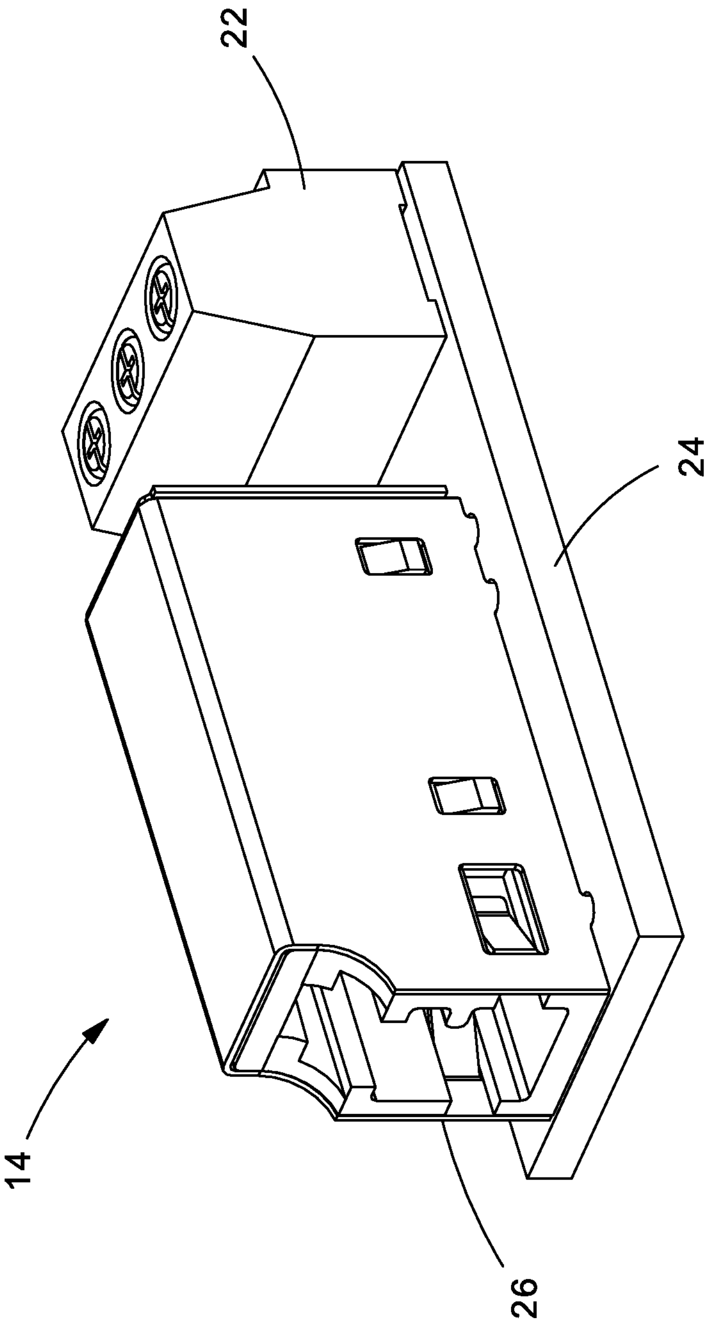
FIG. 2 is an isometric view of the Fieldbus to SPE connector of FIG. 1 without the cables connected.

FIG. 2 shows the fieldbus to single pair ethernet migration coupler 14 having a screw terminal block 22, a printed circuit board 24, and a single pair ethernet LC style medium-dependent interface (MDI) connector 26. Printed circuit board 24 can vary in size to support a plurality of screw terminal blocks and single pair eithernet LC style MDI connectors in a row for use in a patch panel or other component containing a plurality of communications channels.

Figure 3:
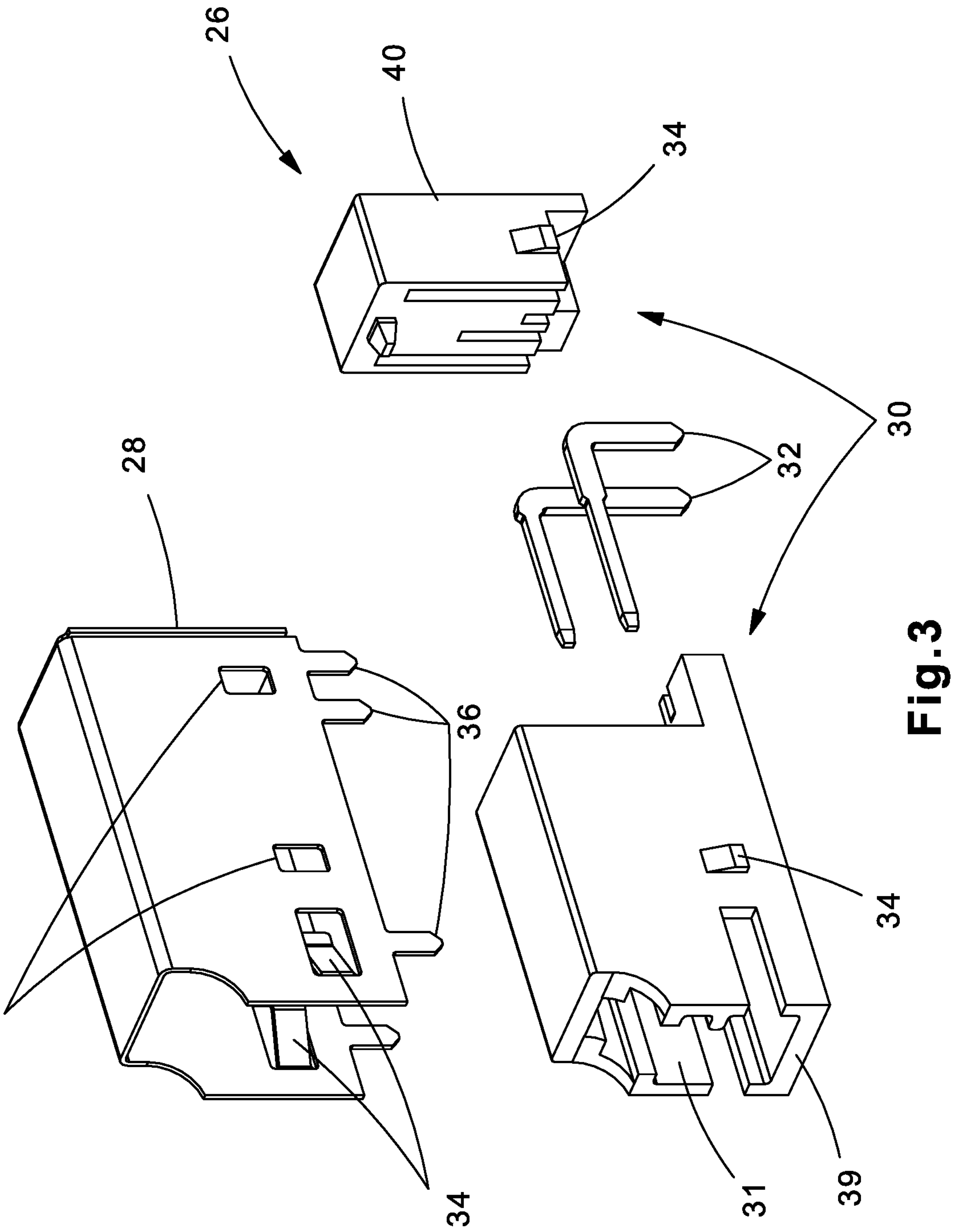
FIG. 3 is an exploded isometric view of the Fieldbus to SPE connector of FIG. 1.

FIG. 3 shows an exploded view of the single pair ethernet LC style MDI connector 26. Single pair ethernet LC style MDI connector 26 includes MDI shield 28, MDI main body 30, and MDI contacts 32. The MDI shield 28 features grounding tabs 34 that make contact with the shield of the mating single pair LC plug 20. MDI shield 28 also has mounting tabs 36 that allow for attachment to printed circuit board 24. MDI main body 30 has MDI main body front section 39 and MDI main body rear section 40. MDI main body front section 39 contains LC interface features (front opening) 31 that allow for mating with corresponding LC plug 20. The outside of the MDI main body 30 has latches 34 that engage with pockets 37 in MDI shield 28.

Figure 4:
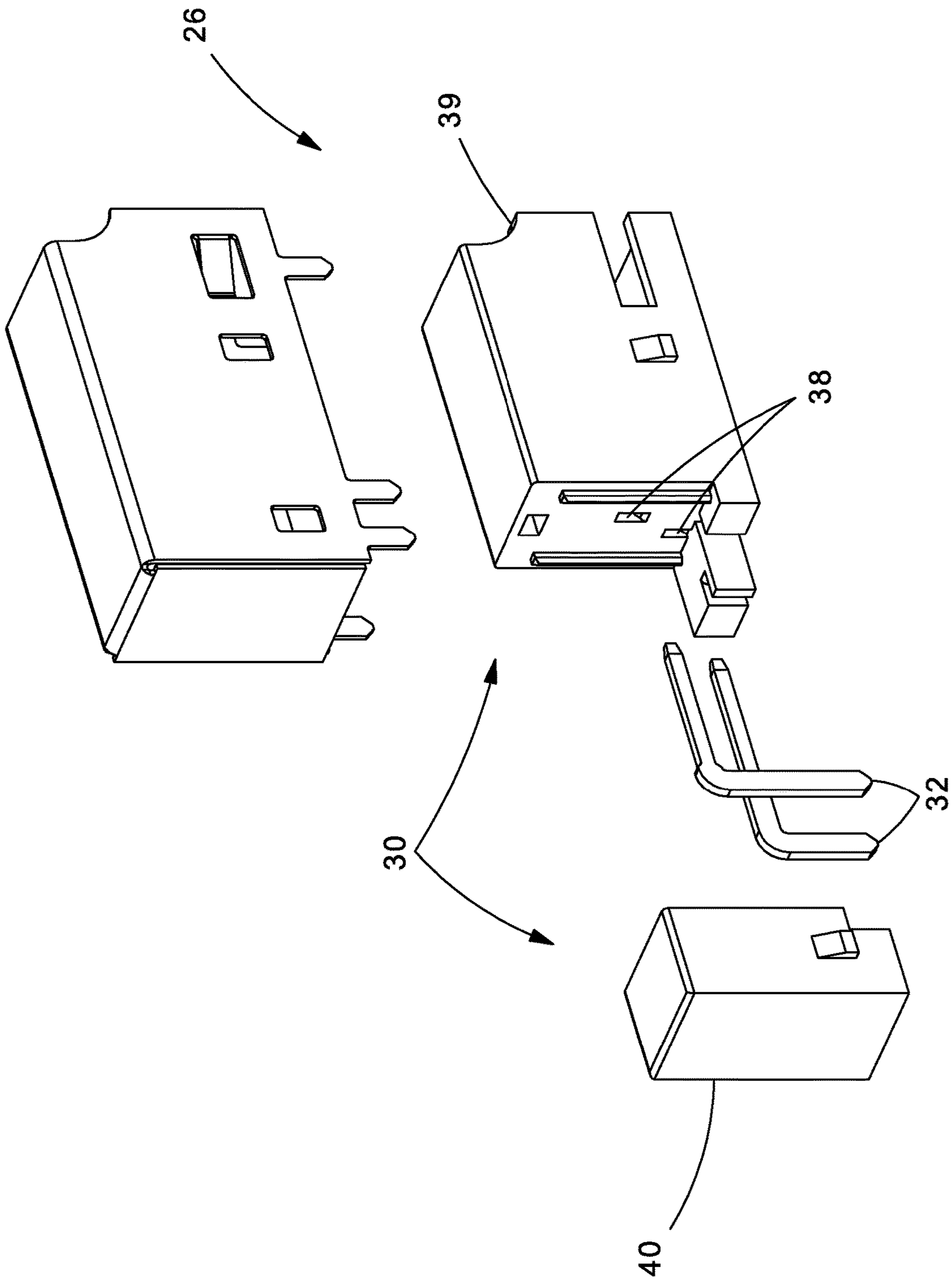
FIG. 4 is another exploded isometric view of the Fieldbus to SPE connector of FIG. 1 from the opposite perspective of FIG. 3.

FIG. 4 shows a rear exploded view of the same single pair ethernet LC style MDI connector 26. MDI contacts 32 insert into slots 38 of MDI main body front section 39. MDI main body rear section 40 retains MDI contacts 32 after they are installed into slots 38.

Figure 5:
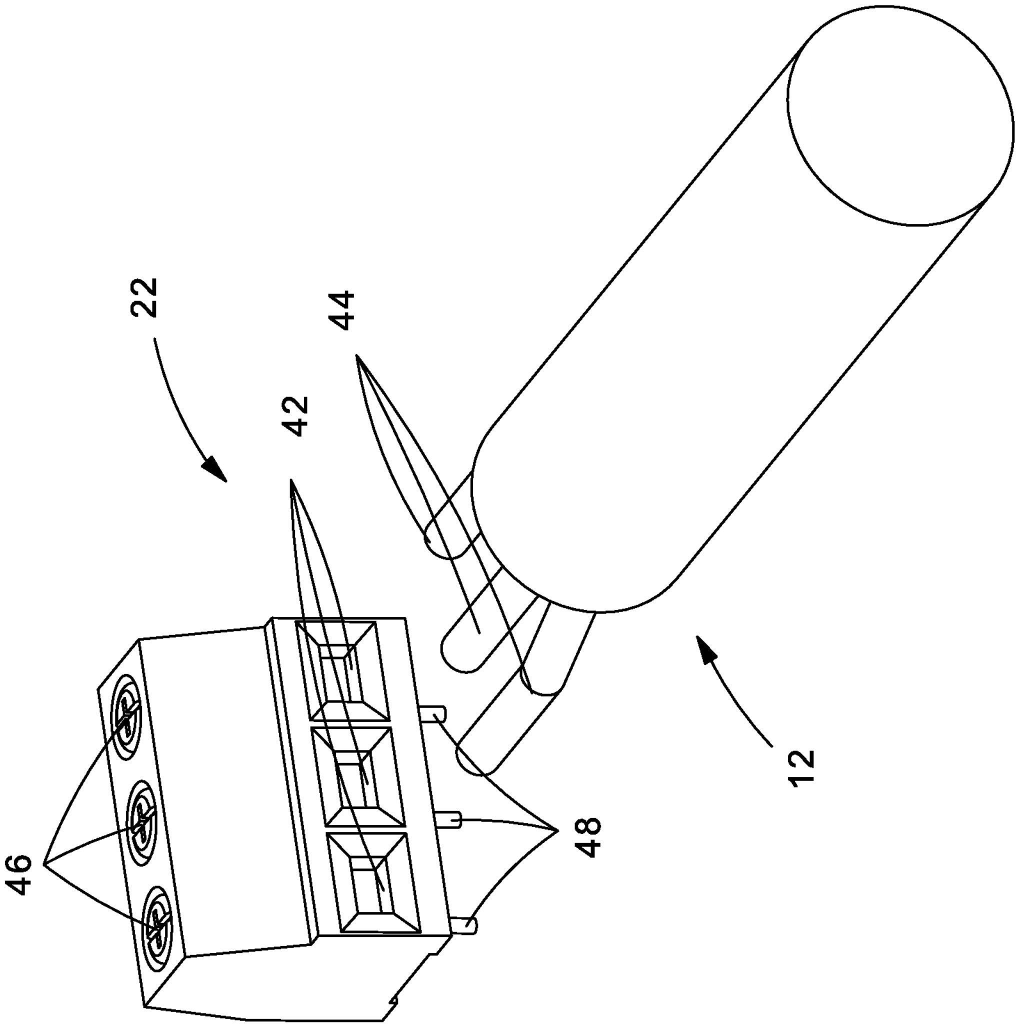
FIG. 5 is an isometric view of a cable being attached to the field bus portion of the connector of FIG. 1.

FIG. 5 shows that the screw terminal block 22 has three conductor entry points 42 to accommodate each conductor 44 of the twisted pair fieldbus cable 12. Screws 46 are tightened to clamp down conductors 44. Pins 48 mount to printed circuit board 24 for mounting and electrical contact.

Figure 6:
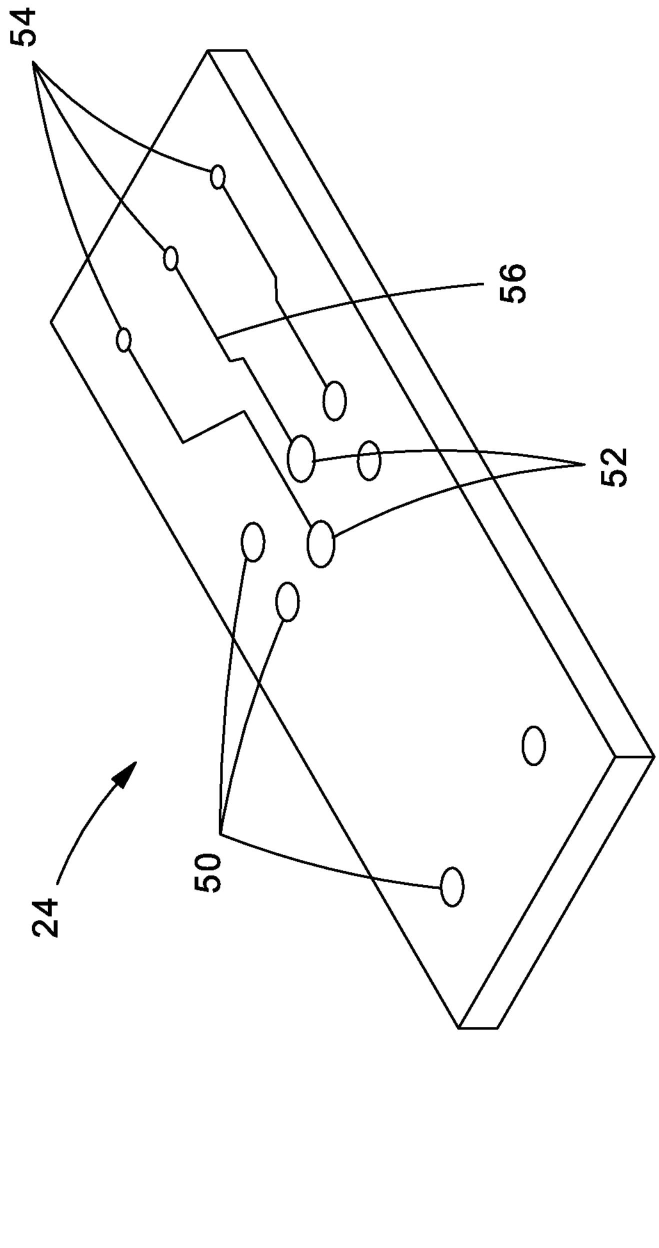
FIG. 6 is an isometric view of the printed circuit board (PCB) of the connector of FIG. 1

FIG. 6 shows the printed circuit board 24. MDI shield mounting holes 50 allow for attachment and electrical contact of MDI shield 28 to printed circuit board 24. MDI conductor mounting holes 52 allow for attachment and electrical contact between the MDI contacts 32 and printed circuit board 24. Screw terminal block mounting holes 54 allow for attachment and electrical contact of screw terminal block 22 to printed circuit board 24. Electrical traces 56 create electrical connections between MDI contacts 32 and corresponding terminal block pins 48.

Figure 7:
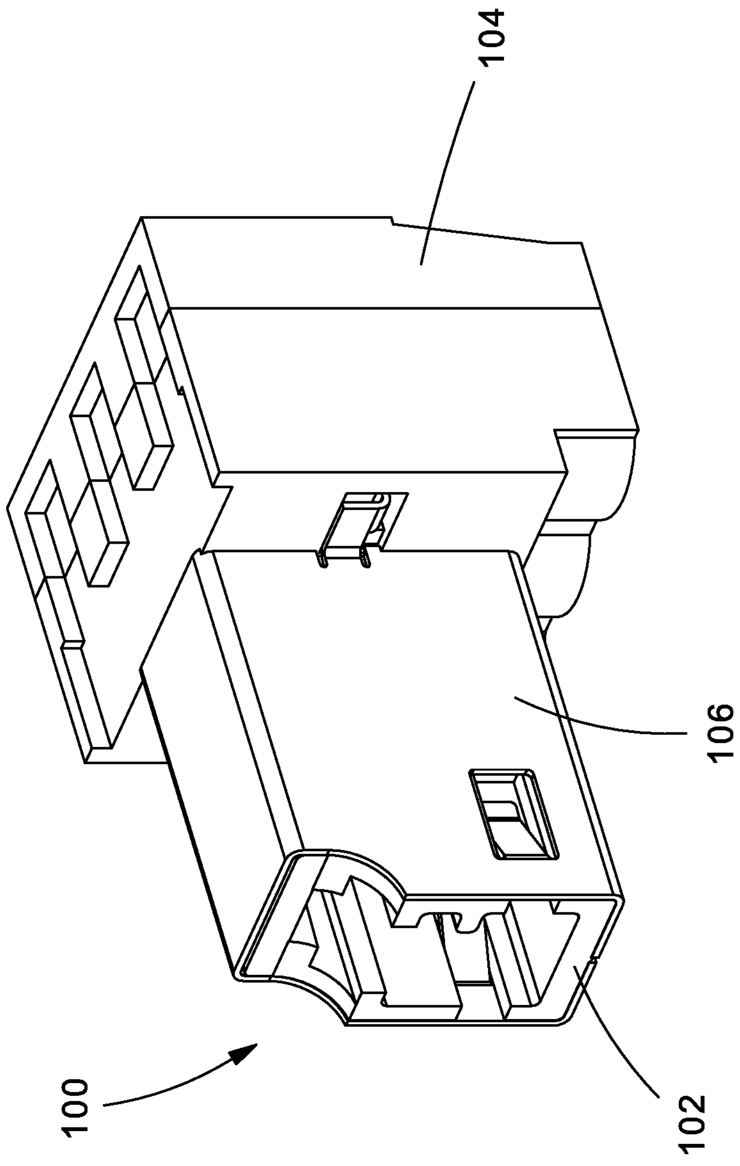
FIG. 7 is an isometric view of a second embodiment of a Fieldbus to SPE connector.
Figure 8:
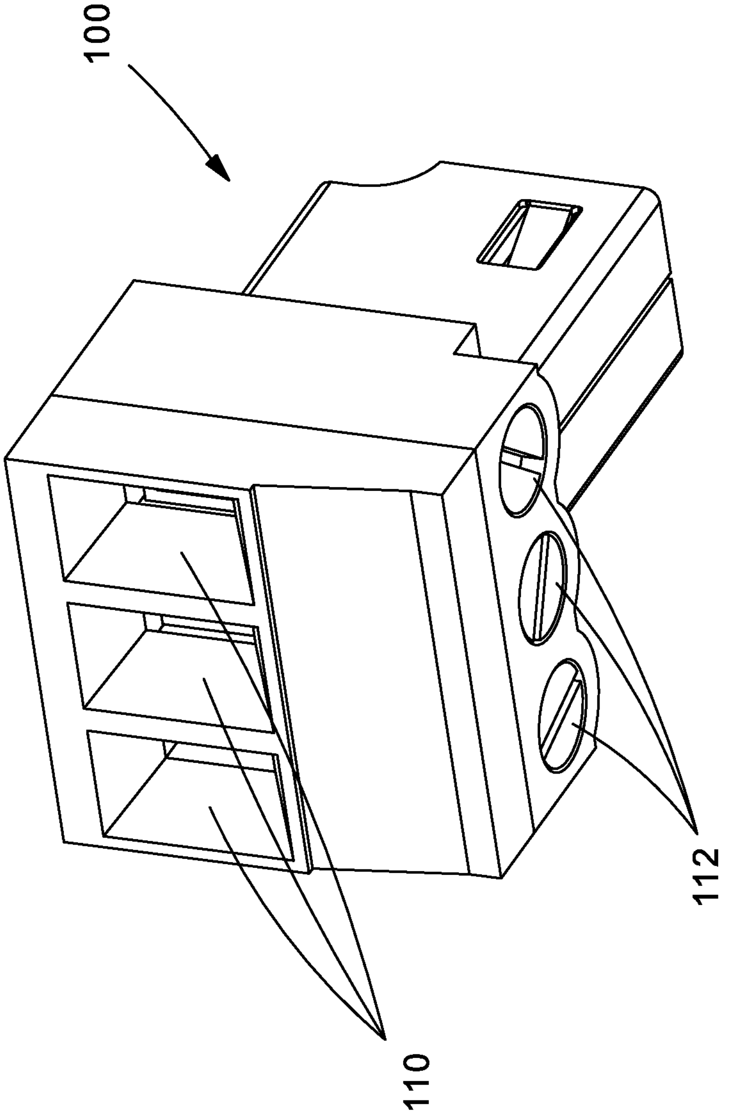
FIG. 8 is another isometric view of the Fieldbus to SPE connector of FIG. 7 from the opposite perspective.

An alternate embodiment of the above described invention is shown in FIG. 7 and FIG. 8. This Fieldbus to single pair ethernet coupler 100 has a single pair LC jack portion and screw terminal portion combined into a main housing 104, which are directly joined to each other without the use of an intermediate printed circuit board. LC jack portion 102 has shielding wrap 106. Screw terminal portion 104 has three conductor entry points (first, second, and third rear openings) 110 and screws 112 to allow for attachment and electrical bonding to a fieldbus cable.

Figure 9:
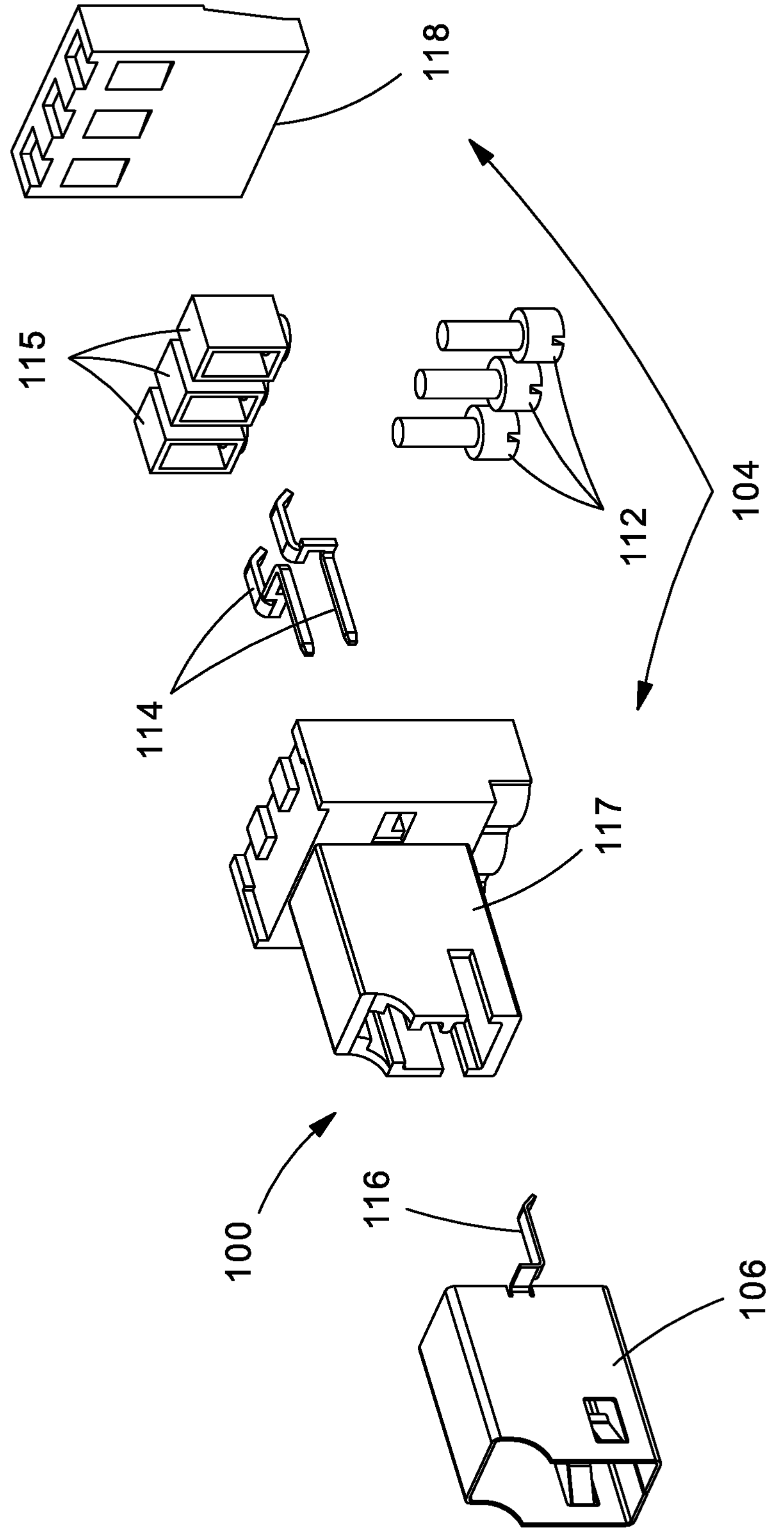
FIG. 9 is an exploded isometric view of the Fieldbus to SPE connector of FIG. 7.
Figure 10:
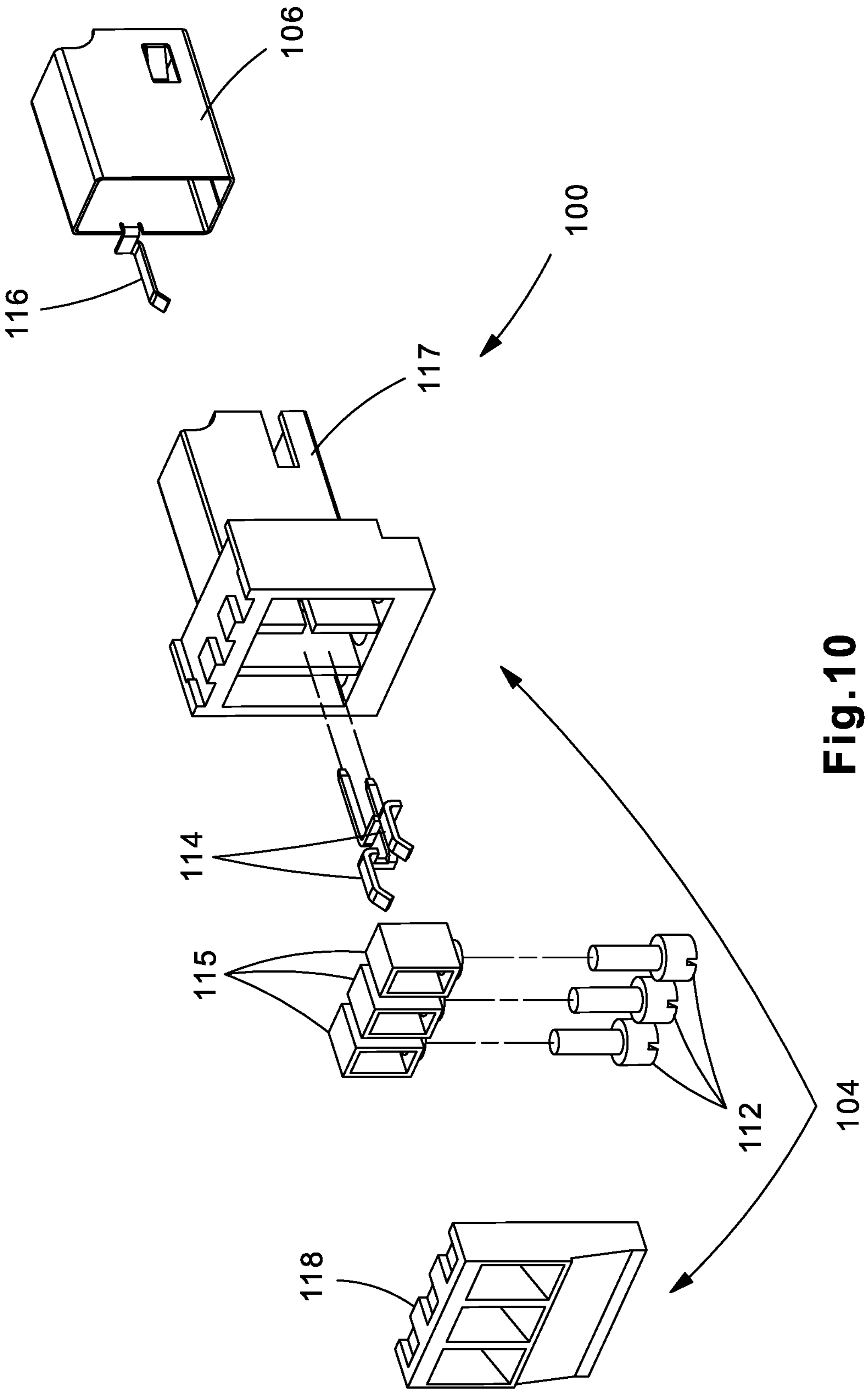
FIG. 10 is another exploded isometric view of the connector of FIG. 7 from the opposite perspective of FIG. 9.

FIG. 9 and FIG. 10 show an exploded view of fieldbus to single pair ethernet coupler 100. Main housing 104 has a front cover 117 and rear cover 118, which contain screws 112, contacts 114, and contact clamps 115. Shielding wrap 106 has shield contact 116, which passes through front cover 117 of main housing 104. The front portion of the front cover 117 has an opening which allows access to contacts 114.

Figure 11:
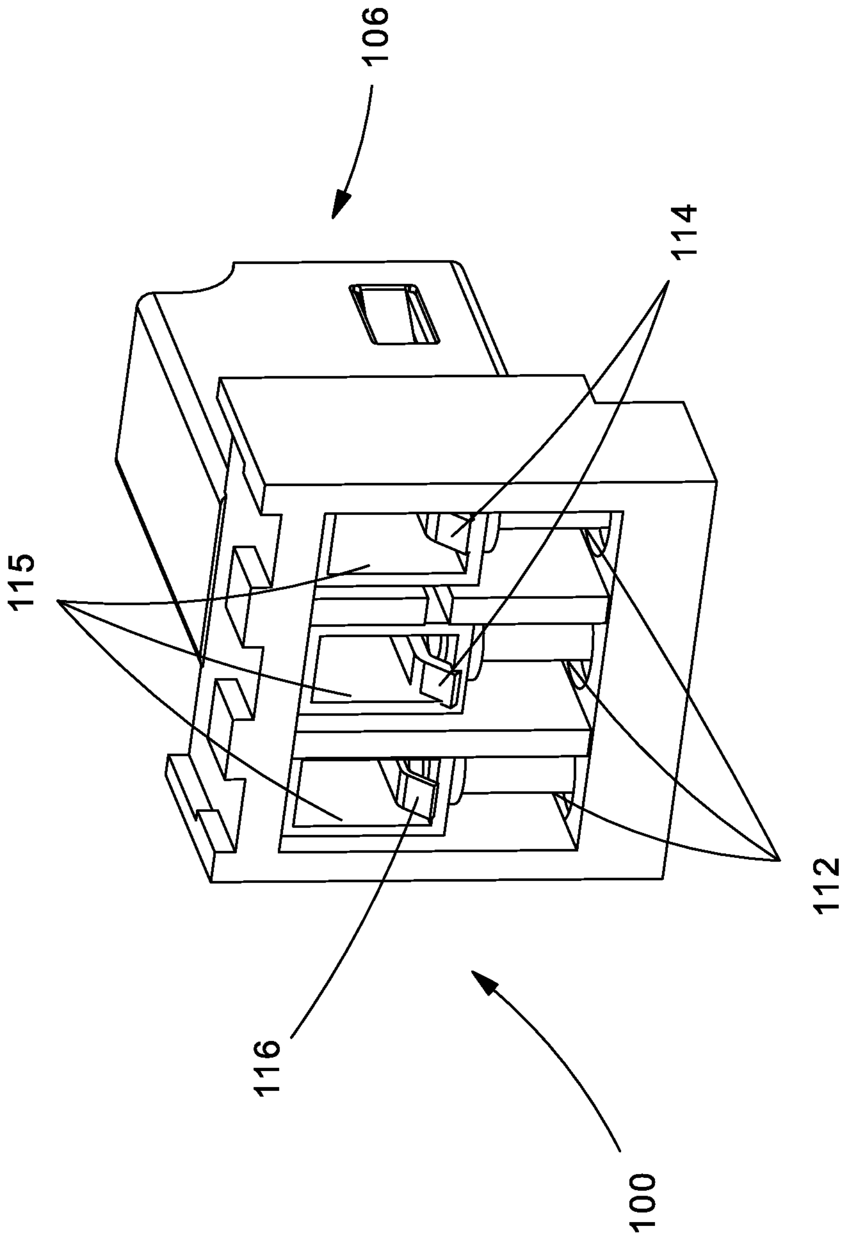
FIG. 11 is an isometric view of the connector of FIG. 7 highlighting the Fieldbus portion.

FIG. 11 shows a rear view of an assembled fieldbus to single pair ethernet coupler 100 with rear cover 118 removed. Screws 112 are captured in the rear of front cover 117 so that they are allowed to turn while remaining in place. Contact clamps 115 have threaded holes that screws 112 engage with so that they can move up and down as screws are turned, which allows them to clamp the fieldbus cable conductors against contacts 114 as well as shield contact 116 of shielding wrap 106.

Figure 12:
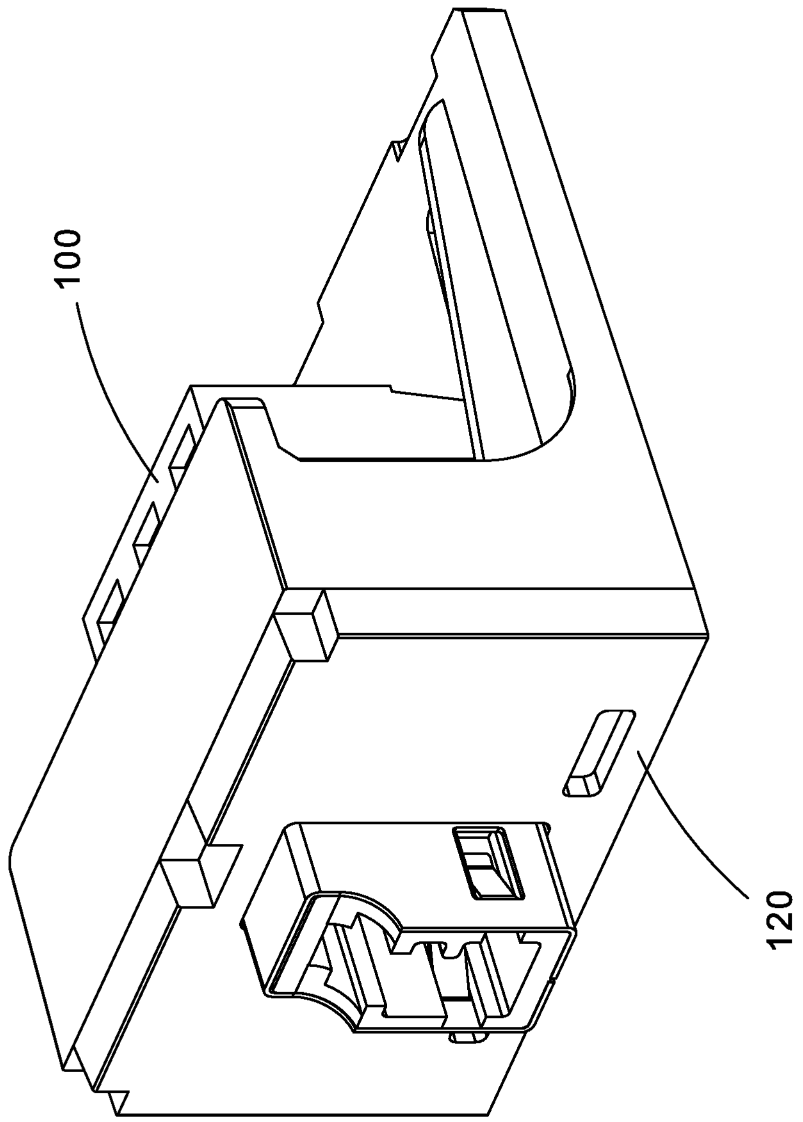
FIG. 12 is an isometric view of the connector of FIG. 7 placed inside a connector sled.

FIG. 12 shows that fieldbus to single pair ethernet coupler assembly 100 may be installed in Minicom sled 120 to allow for installation in standard Minicom panels and faceplates.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A communications connector comprising:

a main housing, the main housing having a front opening and first and second rear openings;

first and second contacts, the first contact extending from the first rear opening of the main housing to the front opening of the main housing and the second contact extends from the second rear opening of the main housing to the front opening of the main housing; and a third rear opening in the main housing, a shield surrounding a front portion of the main housing, and a third contact extending from the third rear opening to the shield.

2. The communication connector of claim 1, wherein the third contact extends through a portion of the main housing.

3. The communication connector of claim 2, wherein the first, second, and third rear openings contain contact clamps which are configured to allow a screw to clamp a conductor inserted in the opening against one of the first, second, or third contacts.

4. The communication connector of claim 3, wherein the main housing comprises a front cover and a rear cover.

* * * * *